(No Model.)

A. O. JONES.
METHOD OF AND MEANS FOR TREATING CLAY WARE.

No. 301,609. Patented July 8, 1884.

Witnesses:
W. A. Seward,
John Lorenz

Athelstan O. Jones  Inventor
by James W. See  Attorney

UNITED STATES PATENT OFFICE.

ATHELSTAN O. JONES, OF COLUMBUS, OHIO.

METHOD OF AND MEANS FOR TREATING CLAY-WARE.

SPECIFICATION forming part of Letters Patent No. 301,609, dated July 8, 1884.

Application filed February 13, 1884. (No model.)

*To all whom it may concern:*

Be it known that I, ATHELSTAN O. JONES, of Columbus, Franklin county, Ohio, have invented certain new and useful Improvements in Clay-Ware-Factory Plants, of which the following is a specification.

The object of this invention is to subject green clay-ware in the factory or storing-room to the action of the heat evolved from baked ware in its cooling; to subject baked ware in its cooling to the action of moisture abstracted from green ware in the factory or storing-room; and to guard against the sweating of the green ware and factory roof or walls, due to the evolution of moisture from the green ware while in the factory or storing-room.

The invention relates to such a peculiar arrangement of the storing-place for green ware, the baking-kiln, and air-conduits as that the objects of my invention will be carried out.

The invention will be readily and thoroughly understood from the following description, taken in connection with the accompanying drawings, in which—

Figure 1:
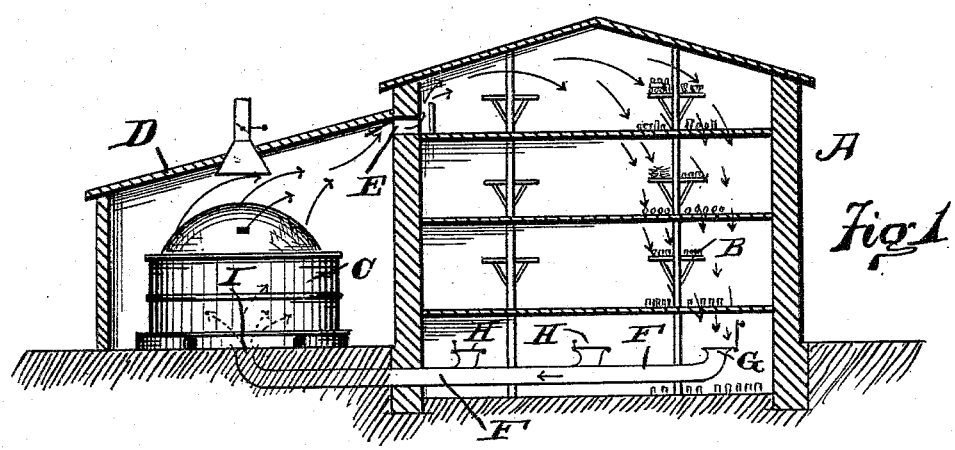
Figure 2:
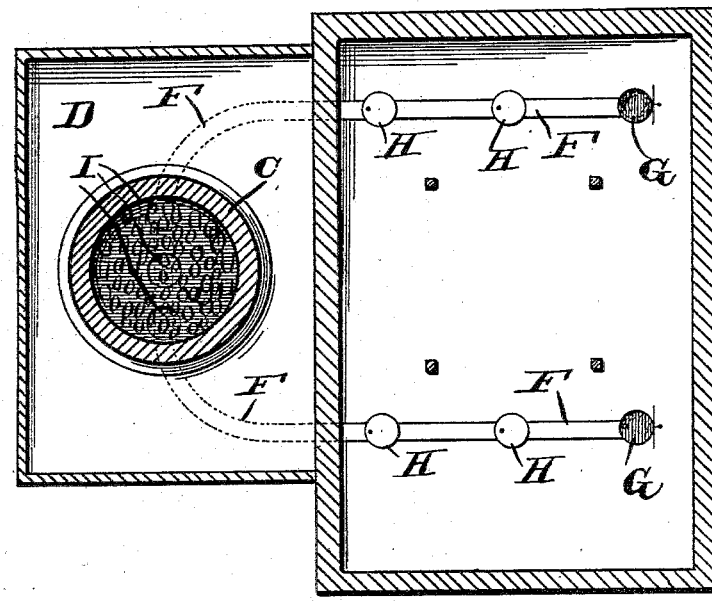

Figure 1 is a vertical section of a clay-ware factory shown as embodying my improvements, and fitted to obtain the objects of my invention; and Fig. 2 is a plan section of the same.

In the drawings, A represents a clay-ware-factory building; B, green ware stored in the right-hand portion of the building; C, the ordinary pottery-kiln; D, the shed over the kiln; E, a conduit from the kiln-shed to the upper portion of the factory-building; F, conduits from the base of the factory to the kiln, at its bottom; G, open admission-orifices at the factory ends of the conduits F, disposed to the right side of the factory-building; H, closed admission-orifices in the factory ends of the conduits F, disposed to the center and left of the factory-building; and I, the discharge-orifices of the conduits F into the base or cross-flues of the kiln.

The kiln is to be of any of the ordinary types, supplied with all of its usual and needed accessories in the way of fire-places, flues, chimneys, &c. It is, so far as the present invention is concerned, to be taken as containing ware which has been baked or burnt, and which is now in the kiln being cooled preparatory to removal, the usual apertures being open for the passage of gases and heat from the kiln and ware. At this stage the kiln-fires are of course extinguished and communication with the draft-chimney cut off. The green ware is stored in the factory or store-room, receiving its preliminary air-drying. In the drawings this ware is shown as being stored, as usual, upon the racks, shelves, and floors of the four stories of the building, the building being shown as being a basement and three upper stories. The left-hand portion of the factory is indicated as not containing any of the ware. The hot air rises from the kiln, passes through the conduits E into the upper portion of the factory-building, where it descends through the green ware to the open orifices G of the conduits F, by which it passes to the base of the kiln. Thence it passes upward through the hot ware in the kiln, thence out again, and so on. The result of this arrangement is: First, the heat from the cooling ware in the kiln is utilized in the preliminary drying of the green ware before it is placed in the kiln; second, the hot air from the kiln entering the factory at or near the top serves to prevent that sweating and dripping which is always so annoying and ruinous in cold weather in factories and dry-rooms stored with green ware; third, the hot ware of the kiln, instead of being subjected to the action of cold or frosty out-door air, which is liable to surface-chill it or disturb the equal contraction and produce checks and cracks, is cooled by the modified air withdrawn from the store-room of the green ware.

The conduits F are provided, as shown, with several orifices by which the air can enter them. By closing some of them and opening others the direction of current through the factory-building or store-room of the green ware may be altered to suit the position of the stored ware. Thus, in Fig. 1, it will be seen that the currents tend to the right through the ware there stored.

If ware be stored only to the left, the orifices G may be closed, and those to the extreme left opened, which will permit a downward current upon the left only. If a general distribution of the currents is desired, all of the orifices may be left opened.

It will be noticed that in the case exhibited by the drawings the shed over the kiln is utilized in part as the conduit by which the air is confined and conducted to the factory; but, in case there is no shed, or similar conducting agent, conducting-pipes may be purposely erected for conveying the heat from the kiln to the store-room of the green ware.

Where the factory or store-room of green ware is constructed with several floors intermediate between the air-inlets and the air-outlets, these floors must be sufficiently open to permit the proper passage of the air. Where there are not sufficient openings in the way of the usual slatted work, stair-cases, &c., through these floors, special apertures may be made for the passage of the air.

The conduits F are shown as being provided each with separately-located admission-orifices provided with doors or dampers. Provided the location of the orifices upon one of these conduits is suited to the storage place of green ware, a single conduit will answer the purpose, the intention in duplicating the conduits being the more general distribution of the inlet-orifices whereby the direction of the air-currents becomes more controllable, it being understood, of course, that the object is to admit the air from the kiln, and to take it from the factory or store-room of green ware at such points as will produce currents through the ware where stored. This understanding governs in regulating the position of the active inlet and outlet orifices.

While I speak generally of a factory-building, I intend to comprise any apartment occupied in whole or in part by green ware, whether that apartment be the whole of the factory or a portion of a factory, special dry-houses, or store-rooms contiguous to the factory, and whether there be green ware or not stored in the apartment, the air-currents directed and controlled as described serve to prevent the sweating referred to.

The conduits F may be located under ground or over, as seems most expedient. The conduits F need not necessarily lead to the kiln.

The air-outlet from the factory or store-room may discharge into the air; but I give preference to the discharge of modified air into the kiln, for the reason previously specified.

Where conditions of relative location of kiln and apartment render it necessary, the circulation of the hot air may be accelerated by means of fans or other similar agents commonly used for the purpose.

The heat from cooling ware has been heretofore utilized to effect the initial heating of green ware in another kiln; but, so far as I am aware, the devices by which such utilization was effected have always involved essentially two or more kilns. I am not aware that any system has been heretofore devised in which, where a single kiln only is employed, the waste heat from cooling-ware has been utilized in the preliminary drying of green ware before the green ware was placed in the kiln; nor am I aware that the heat from cooling ware has been utilized in preventing the sweating of factory-walls; nor am I aware that the modified air from green ware has been utilized in cooling previously-baked ware in the kiln, though the cooling has heretofore been effected by air tempered by heat, the devices employed consisting, essentially, of two or more kilns arranged to act in conjunction.

I claim as my invention—

The combination of a clay-ware-factory building, a burning kiln, and air-conduits between the burning kiln and the factory-building, substantially as and for the purpose set forth.

ATHELSTAN O. JONES.

Witnesses:
JOHN C. L. PUGH,
D. F. PUGH.